UNITED STATES PATENT OFFICE.

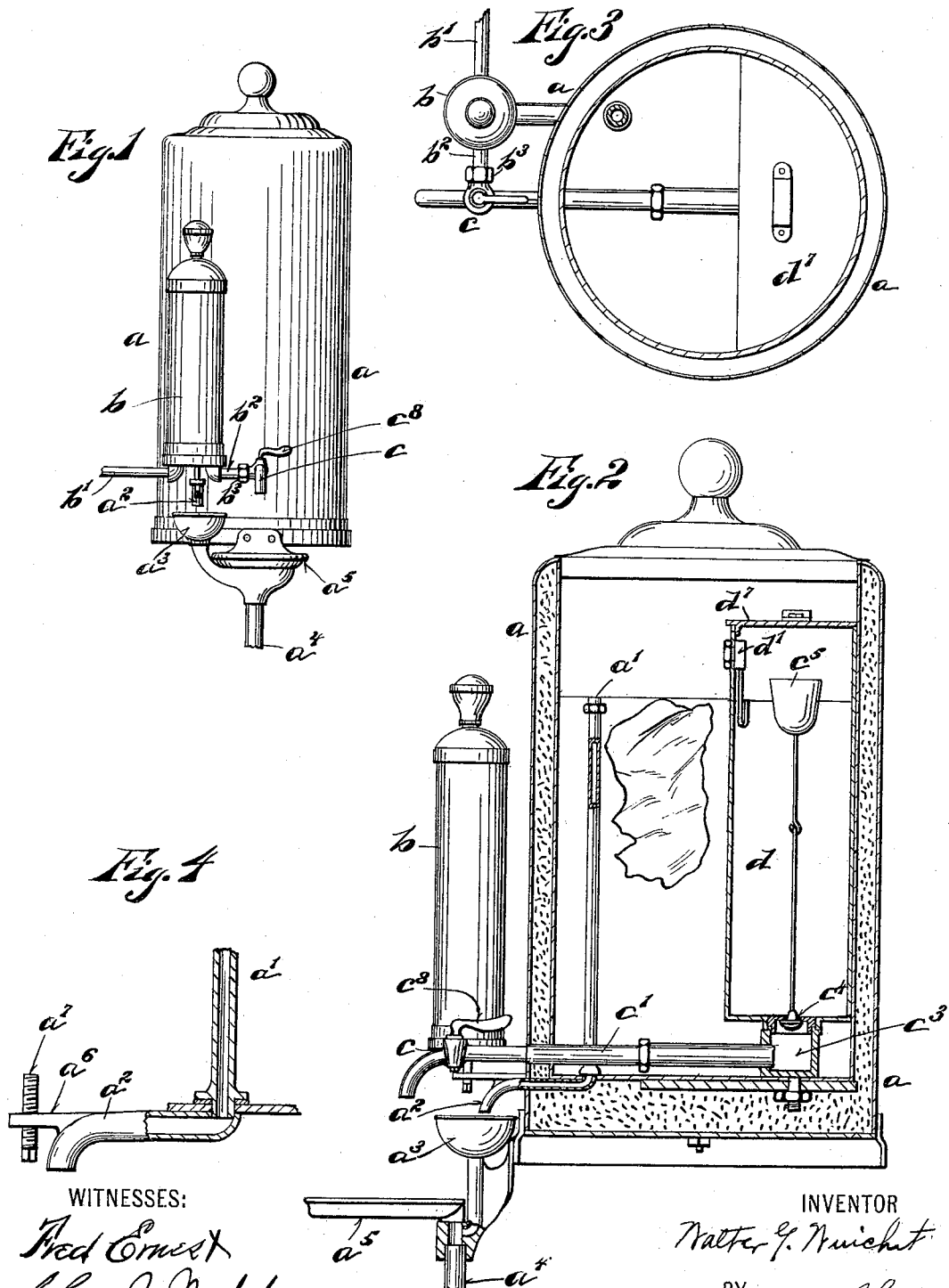

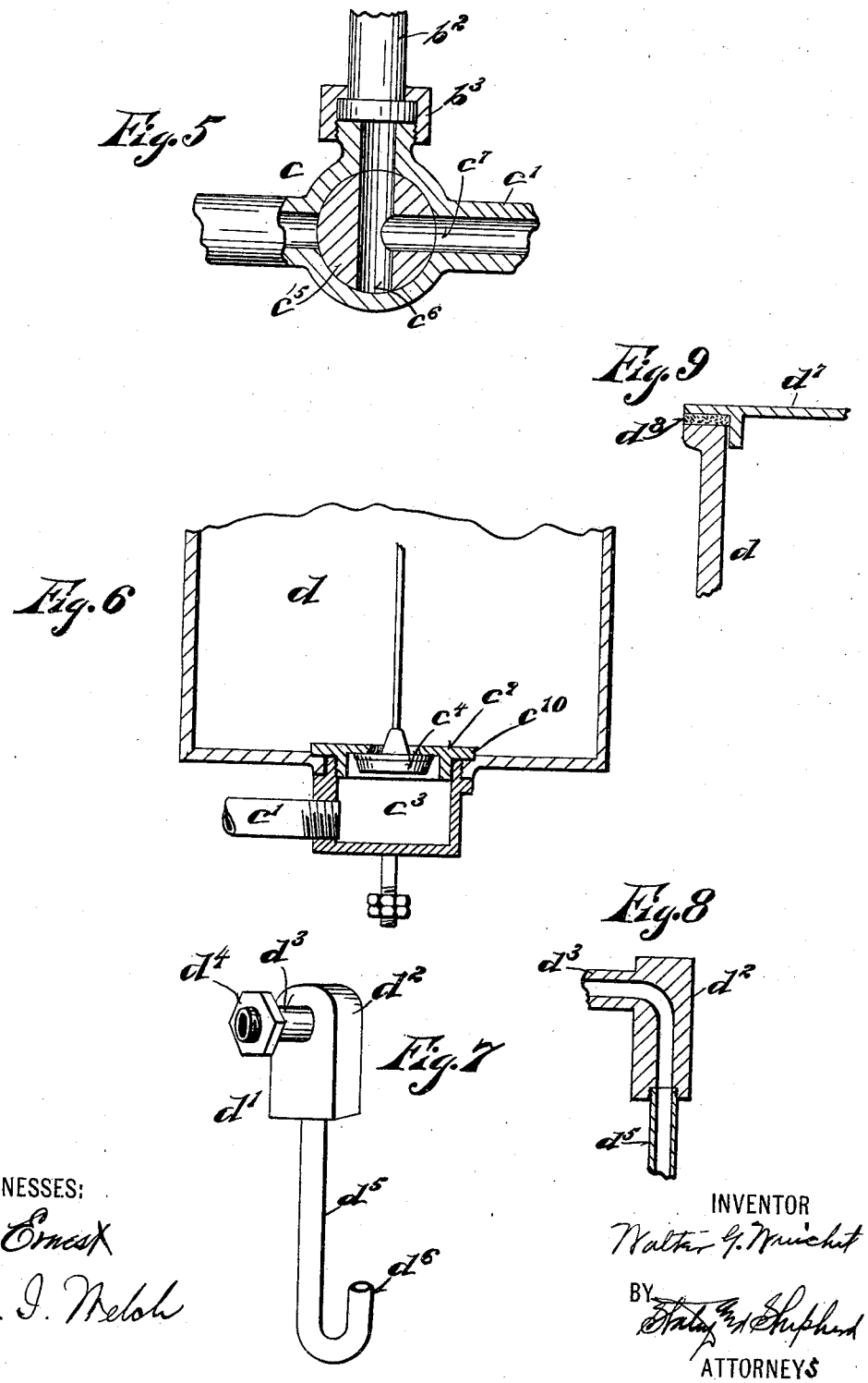

WALTER G. WUICHET, OF DAYTON, OHIO, ASSIGNOR TO THE PASTEUR-CHAMBERLAND FILTER COMPANY, OF SAME PLACE.

COMBINED FILTER AND COOLER.

SPECIFICATION forming part of Letters Patent No. 615,941, dated December 13, 1898.

Application filed June 23, 1894. Serial No. 515,498. (No model.)

*To all whom it may concern:*

Be it known that I, WALTER G. WUICHET, a citizen of the United States, residing at Dayton, in the county of Montgomery and State of Ohio, have invented certain new and useful Improvements in a Combined Filter and Cooler, of which the following is a specification.

My invention relates to improvements in combined filters and coolers.

The object of my invention is to provide an improved filter and cooler in which the filtering apparatus shall be arranged on the outside of the cooling device and convenient for cleaning, the arrangement of the cooling device being such as will render it readily accessible for cleaning or otherwise.

A further object of my invention is to provide an improved and simple construction by means of which the water or other liquid to be filtered may be drawn direct from the filter or from the cooler or from the filter and cooler, as desired.

A further object of my invention is to provide a simple arrangement of parts by which the reservoir for the filtered water is supplied from the filter through the same passage which serves as an outlet from said reservoir.

A further object of my invention is to provide means by which the reservoir for the filtered water may be maintained in a sterilized condition and air contamination of the filtered water therein prevented.

I attain these objects by the constructions shown in the accompanying drawings, in which—

Figure 1 is a front elevation of a device embodying my invention. Fig. 2 is a sectional elevation, and Fig. 3 is a transverse section, of the same. Fig. 4 is a detail of the waste-pipe and overflow. Fig. 5 is a sectional view of the three-way valve or cock in detail. Fig. 6 is an enlarged sectional view of the float-valve and reservoir in detail. Figs. 7 and 8 are detail views of the trapped overflow for the filtrate from the reservoir. Fig. 9 is a detail of the top of the reservoir and cover, showing the antiseptic arrangement of the reservoir.

Like parts are represented by similar letters of reference in the several views.

In the said drawings, $a\,a$ represent an outer casing which is formed with double walls, which may be filled with any non-conducting material to form a cooling-chamber in the usual manner.

$b$ is the filter, which may be of any desired construction, but which preferably consists of the Chamberland filtering-bougies of porous porcelain inclosed in a suitable casing in the usual manner, so that the filtrate passes through the walls of said porous porcelain in passing through the filter. $b'$ is an inlet for said filter, and $b^2$ an outlet. The outlet $b^2$ of the filter is connected by a suitable union connection $b^3$ to a three-way valve or cock $c$. This cock $c$ is provided at one end with the usual outlet and at the other is connected to a pipe $c'$, which leads to the reservoir $d$, arranged in the cooling-chamber $a\,a$, the pipe $c'$ being connected to said reservoir $d$ through the medium of a valve-chamber $c^3$, in which is located a valve $c^4$, attached to a float $c^5$ in the reservoir $d$, the construction being such that when the water in the reservoir $d$ rises to a suitable height the valve $c^4$ is closed by the action of the float $c^5$. Arranged in the side of the reservoir $d$ is an overflow $d'$, which consists, essentially, of a small metallic head $d^2$, having an extended neck $d^3$, adapted to project through the wall of the reservoir and provided with a clamping-nut $d^4$, by which the head may be secured in position, with the neck $d^3$ extending through the wall of the reservoir, a suitable packing being employed to form a tight joint. The head $d^2$ is further provided with a downwardly-projecting pipe $d^5$, with an upturned end $d^6$ to form a trap, this pipe $d^5$ being extended down sufficiently, so that the water in the reservoir will rise above the end of said pipe and thus seal the same against the admission of air to said overflow and at the same time permit the water from the reservoir to escape in the cooling-chamber in the event that the float $c^5$ should for any reason fail to operate to close the valve $c^4$. The reservoir $d$ is provided with a removable lid $d^7$. This lid $d^7$ is provided around the outer edge, where it rests on top of the reservoir $d$, with an antiseptic packing-ring $d^8$, of cotton or other suitable fibrous material, which will permit the passage of air through the same, but will prevent the passage of any germs or other substance which would contaminate the filtrate in the reservoir.

The cock $c$, which connects with the filter and with the reservoir, is provided with a barrel $c^{15}$, having a straight passage $c^6$ and an auxiliary or right-angled passage $c^7$, so that by turning it in different positions the filter may be connected to the reservoir or to the outlet-opening of the valve or cock $c$ or closed off entirely, while the reservoir is connected to the outlet-opening. In the position shown in Fig. 5 the valve is in the normal position, in which the filter will be connected to the reservoir, in which case the handle $c^8$ of the cock will be in the position indicated in Fig. 1. By turning the handle forward the filter will be cut off and the reservoir will communicate with the discharge-opening of the cock, thus drawing the water from the reservoir and cutting off the filter. By turning the handle in the opposite direction—that is, to the position shown in Fig. 2—a communication will be established both from the filter and from the reservoir to the discharge-opening of the cock, By turning the handle so that it points in the direction of the filter—that is, a half-revolution from the position shown in Fig. 1—then the reservoir will be cut off and the filter alone will communicate with the cock, so that by the arrangement a single pipe connection with the reservoir is sufficient, while at the same time the water may be drawn through from the filter or from the reservoir, or from both, by the use of a single valve $c$, as described.

The reservoir $d$ is preferably formed in the shape of a segment, so as to occupy the rear portion of the cooling-chamber $a\,a$, the pipe $c'$ from the reservoir being extended through the bottom of said chamber, where it comes in contact with the ice or cold water within the cooling-chamber. An overflow-pipe $a'$ is employed in the cooling-chamber, by means of which a quantity of water sufficient to practically surround the filtrate in the reservoir is maintained in the cooling-chamber. The end of the overflow-pipe $a'$ being open, the water is permitted to escape through the same whenever it rises to the required height. This overflow-pipe $a'$ communicates with a suitable discharge-pipe $a^2$, which leads to the outside of the cooling-chamber and is adapted to discharge into a bowl or receiver $a^3$, connected to a discharge-pipe $a^4$, which leads to a sewer or other convenient point of discharge. A drip-pan $a^5$ is also provided below the cock $c$, which communicates in a similar way with the discharge-pipe $a^4$. The overflow-pipe $a'$ is made removable, as shown in Fig. 4, so that by removing said pipe all the water from the ice-chamber or cooling-chamber may be drawn off. The filter $b$, as before stated, is connected to the cock $c$ by a union $b^3$, so that it may be readily removed therefrom. To provide for supporting the filter, I construct on the escape-pipe $a^2$ an extended lug $a^6$, perforated at its outer end to receive an adjustable support $a^7$, preferably in the form of a screw, which may be turned so as to rest in contact with the bottom of the filter, and thus assist in supporting the same, the construction being such that the support may be readily adjusted to hold the filter in proper position, and thus relieve the pipe connection $b^2$ of any undue strain. The valve-chamber $c^3$ is formed with a removable cap $c^9$, adapted to screw into the top of the valve-chamber and form a valve-seat, said cap being provided with extended flanges $c^{10}$, which project outwardly so as to clamp the bottom of the reservoir, which is provided with a suitable perforation to receive the top of the valve-chamber, so that said cap serves the double purpose of forming a cap for the valve-chamber and a clamp for securing it in position in the reservoir.

It will be seen from the above description that a filter and cooler is provided which is extremely simple in construction and in which all the parts are accessible for cleaning, and at the same time the filtrate may be maintained in a perfectly-sterilized condition if sterilized by the filter, which will be the case if the Chamberland filtering-bougies are employed in the manner set forth. The reservoir being surrounded with the cooling liquid and being cut off by water seal and an antiseptic cover is prevented from contamination of any kind, while at the same time it is maintained at any suitable temperature desired by imparting the required temperature to the cooling liquid in the outer cooling-chamber.

Having thus described my invention, I claim—

1. The combination with a cooling-chamber, of a filter connected with a three-way cock, and a reservoir for the filtered water in said cooling-chamber, a pipe connection from the reservoir to the three-way cock, said three-way cock having a discharge-outlet whereby by manipulating the three-way cock the discharge-outlet may be placed in direct communication with the reservoir or with the filter or the filter put in communication with the reservoir, substantially as described.

2. The combination with a cooling-chamber of a reservoir having a float therein, a valve-chamber under said reservoir having a valve connected to said float, said valve-chamber being located beneath said reservoir and detachably connected to the cooling-chamber and the reservoir, respectively, and a pipe from said valve-chamber leading to the outside of said cooling-chamber, substantially as specified.

3. The combination with a cooling-chamber, of a reservoir having a float therein, a valve-chamber under said reservoir having a valve connected to said float, said valve-chamber being removably secured to said reservoir by a cap which also closes said valve-chamber, substantially as specified.

In testimony whereof I have hereunto set my hand this 19th day of June, A. D. 1894.

WALTER G. WUICHET.

Witnesses:
JOHN A. MILLER,
H. J. CHANCELLOR.